Oct. 28, 1924.
H. G. WEBB
AUXILIARY AIR SUPPLY
Filed Nov. 23, 1922
1,513,142
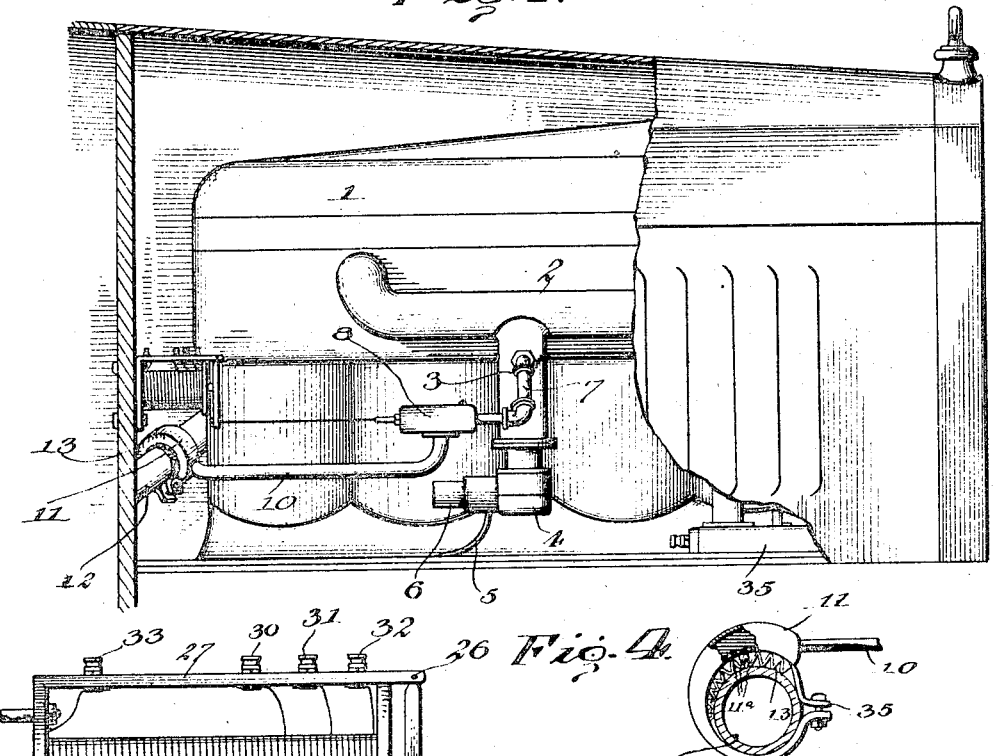
Fig. 1.
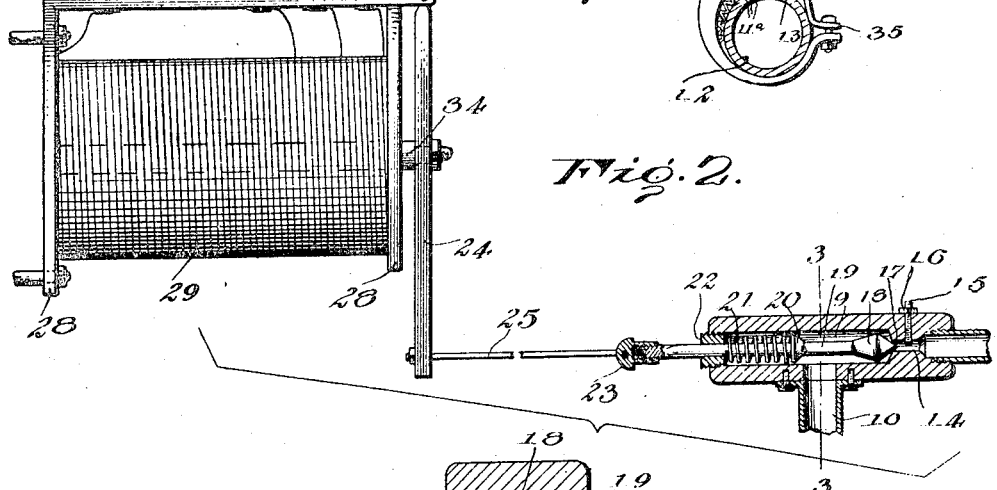
Fig. 4.
Fig. 2.
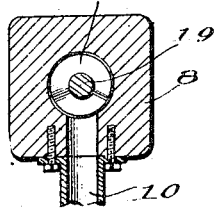
Fig. 3.
WITNESSES
INVENTOR
H. G. Webb,
BY
ATTORNEYS Patented Oct. 28, 1924.

1,513,142

UNITED STATES PATENT OFFICE.

HENRY GRADY WEBB, OF ATLANTA, GEORGIA.

AUXILIARY AIR SUPPLY.

Application filed November 23, 1922. Serial No. 602,913.

*To all whom it may concern:*

Be it known that I, HENRY GRADY WEBB, a citizen of the United States, and a resident of Atlanta, in the county of Fulton and State of Georgia, have invented certain new and useful Improvements in Auxiliary Air Supplies, of which the following is a specification.

This invention relates to an auxiliary air supply to the intake manifold of an internal combustion engine and has for its object the provision of a device for automatically supplying auxiliary air to the intake manifold of the internal combustion engine in accordance with the engine needs.

A further object of the invention is the provision of a device for automatically supplying auxiliary air to the combustible mixture passing through the intake manifold of an engine, the volume of air supplied depending upon the electric current developed by the generator operated by the engine.

Other objects and advantages will become apparent during the course of the following description.

The invention is illustrated by way of example in the accompanying drawings, in which, Figure 1 is a side elevation of an internal combustion engine equipped with my improved auxiliary air supply device.

Figure 2 is an enlarged detail view partly in section showing the auxiliary air supplying device.

Figure 3 is a transverse vertical section taken along the line 3—3 of Figure 2.

Figure 4 is a sectional detail of the heating stove connected with the exhaust pipe.

Referring to the drawings 1 designates an internal combustion engine provided with the usual intake manifold 2 having a depending conduit 3 connected in the usual manner with a carbureter 4. A fuel conduit 5 is connected with the carbureter. An air intake 6 supplies air for forming the combustible mixture which is ordinarily fed to the engine.

Connected to the conduit 3 of the intake manifold is a pipe 7 which is connected to a valve casing 8. A chamber 9 in the valve casing is connected by a conduit 10 to a hollow hot air stove 11 embracing the exhaust pipe 12 of said engine.

A corrugated baffle 13 is located between the stove 11 and the exhaust pipe for spacing the stove from said pipe and also aid in heating the air passing through the perforations 11ª formed in the inner wall of said stove. Flanges 35 at the ends of the stove are provided for securing the stove to the exhaust pipe.

A reduced passage 14 connects the chamber 9 of the valve casing 8 with the conduit 7. A set screw 15 having its lower end projecting into the passage 14 provides means for regulating the flow of air from the chamber 9 to the intake manifold. A lock nut 16 is adapted to lock the set screw in any one of its adjusted positions.

A seat 17 is formed at the inner end of the passage 14 which is adapted to be engaged by the conical valve 18. The stem 19 of the valve is provided with a shoulder 20 engaged by one end of a coil spring 21 with the other end of the spring engaging a plug 22 having a threaded engagement with the open end of the valve casing 8. The adjustment of the plug 22 relieves or increases the tension on the spring 21.

An adjusting cap 23 having threaded engagement with the outer projecting end of the valve stem 19 is adapted to increase the tension on the pivoted arm 24 which is connected at its lower end by means of a link 25 to the cap 23. The arm 24 is pivotally connected at 26 to the projecting end of the top of a frame 27. Between the parallel legs 28 of the frame is mounted a four-stage coil 29 having binding posts 30, 31 and 32 and a post 33. A wire connected with the post 33 is grounded on the engine.

The frame 27 is mounted in a fixed position in any approved manner to the dash of the automobile. Rigidly secured to the arm 24 is an armature 34 adapted to be moved into a cylindrical passage within the coil 29 when said coil is electrically charged by a generator 35 which is operated by the engine for starting, lighting and ignition purposes.

The operation of my device is as follows:

The generator of the engine is connected with any one of the three binding posts 30, 31 and 32. I have provided three separate binding posts, each one being connected with varying turns of the coil 29 so that it is possible to use the coil with generators having voltages between certain limits. Since the voltages of the various generators used on different makes of machines vary different numbers of amperage turns will be required to step up the current for uniformly moving the armature 34 through the same distance or for operating the valve uniformly for all speeds of the various makes of machines. When certain turns of the coil 29 are energized the armature 34 is moved inwardly of the passage formed centrally of the core thereby oscillating the arm 24 and moving the link 25 outwardly and thereby withdrawing the valve 18 farther away from the port 17 at the inner end of the passage 14 to permit more warm air from the conduit 10 to charge the intake manifold through the conduit 7. The valve 18 is moved outwardly against the tension of the spring 21 and when the coil 29 is not energized the spring will move the valve onto its seat and close the passage 14 to the intake manifold, thereby shutting off the warm air from the stove 13. The cap 23 when adjusted will vary the time of opening or closing the valve 18.

The coil 29 is not energized by the electric generator until the crank shaft begins to exceed 200 revolutions per minute. It will be seen that as the electric energy in the coil 29 is gradually increased the armature 34 will be moved farther into the coil and thereby move the valve 18 farther from its seat to admit a greater quantity of air. The amount of air admitted will be in proportion to the speed of rotation of the engine and therefore in proportion to the engine needs. When the number of revolutions of the engine shaft decreases the voltage of the generator will be proportionately decreased with a gradual closing of the valve 18.

Where the coil is connected up with the generator of the Ford engine, the coil will not be energized except when the current is in excess of the ignition demands which will be at the time when the automobile has approximately the speed of 15 miles per hour. This condition may vary depending upon the different types of the Ford flywheel generators.

What I claim is:

In an internal combustion engine provided with an electric generator, an intake manifold, a conduit for supplying auxiliary air to said manifold, a hollow member for connecting the conduit with the intake manifold, a plug for closing one end of the hollow member and provided with a central passage, a valve stem slidably mounted in the passage in the plug, a restricted discharge passage at the other end of the hollow member, adjustable means projecting into the passage for varying the flow of air to said restricted passage, a valve on the stem adapted to engage the inner end of the restricted passage for controlling the flow of auxiliary air to the manifold from said conduit, a magnet connected with the electric generator of the engine, an arm pivoted relative to said magnet and connected with the movable armature of said magnet whereby when the magnet is energized by the generator said arm is oscillated, means connecting the oscillating arm with the valve stem, and means included in the last named means for adjusting the position of the valve relative to the seat.

HENRY GRADY WEBB.